US008926247B2

United States Patent
Schaser et al.

(10) Patent No.: US 8,926,247 B2
(45) Date of Patent: Jan. 6, 2015

(54) WASHER ASSEMBLY

(75) Inventors: Robert R. Schaser, Hampshire, IL (US); Jason D. Holt, St. Charles, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 13/981,868

(22) PCT Filed: Jan. 24, 2012

(86) PCT No.: PCT/US2012/022374
§ 371 (c)(1),
(2), (4) Date: Oct. 1, 2013

(87) PCT Pub. No.: WO2012/103097
PCT Pub. Date: Aug. 2, 2012

(65) Prior Publication Data
US 2014/0017032 A1    Jan. 16, 2014

Related U.S. Application Data

(60) Provisional application No. 61/435,931, filed on Jan. 25, 2011.

(51) Int. Cl.
*F16B 43/00* (2006.01)
*F16F 3/12* (2006.01)

(52) U.S. Cl.
CPC ............ *F16B 43/001* (2013.01); *F16F 3/12* (2013.01)
USPC .................. 411/371.1; 411/542; 411/546

(58) Field of Classification Search
USPC ........ 411/371.1, 371.2, 372.5, 531, 541, 542, 411/544, 546, 547, 943
See application file for complete search history.

(56) References Cited

U.S. PATENT DOCUMENTS

| | | | |
|---|---|---|---|
| 1,301,302 A * | 4/1919 | Nolan | 411/531 |
| 1,951,013 A | 9/1929 | Flintermann | |
| 2,339,549 A | 3/1941 | Kubaugh | |
| 2,639,789 A * | 5/1953 | Rosenberg | 403/52 |
| 2,982,573 A * | 5/1961 | McKee, Jr. | 411/542 |
| 3,160,054 A * | 12/1964 | Cohen et al. | 411/371.1 |
| 3,168,321 A * | 2/1965 | Glicksman | 277/637 |
| 3,170,701 A * | 2/1965 | Hoover | 411/542 |

(Continued)

FOREIGN PATENT DOCUMENTS

| | | |
|---|---|---|
| CN | 201187514 Y | 1/2009 |
| DE | 9012855.9 U1 | 12/1990 |
| FR | 2186077 A5 | 1/1974 |
| WO | 2010/101693 A1 | 9/2010 |

OTHER PUBLICATIONS

International Search Report for International Application No. WO 2012/103097 dated Jun. 13, 2012.

*Primary Examiner* — Roberta Delisle
(74) *Attorney, Agent, or Firm* — Paul F. Donovan

(57) ABSTRACT

A washer assembly is configured to isolate a work-piece from a fastener and/or another structure. The washer assembly includes a rubber isolator having at least one protuberance configured to directly contact a surface of the work-piece, and a metal strengthening member permanently secured to the rubber isolator. The protuberance(s) is configured to be compressed during a normal operating condition. The metal strengthening member is configured to be compressed during a peak operating condition in which greater force is exerted into the washer assembly than during the normal operating condition.

20 Claims, 6 Drawing Sheets

(56) References Cited

U.S. PATENT DOCUMENTS

| | | | | |
|---|---|---|---|---|
| 3,447,229 A | * | 6/1969 | Clark | 29/418 |
| 3,452,636 A | * | 7/1969 | Cohen et al. | 411/371.1 |
| 3,500,712 A | * | 3/1970 | Wagner | 411/371.1 |
| 3,606,357 A | * | 9/1971 | Yonkers | 411/537 |
| 3,661,046 A | * | 5/1972 | Waud et al. | 411/369 |
| 4,067,184 A | * | 1/1978 | Johnson, Jr. | 57/135 |
| 4,292,876 A | * | 10/1981 | De Graan | 411/542 |
| 4,712,802 A | * | 12/1987 | Hewison et al. | 411/542 |
| 4,934,857 A | * | 6/1990 | Swanson | 403/30 |
| 5,618,145 A | * | 4/1997 | Kuo | 411/432 |
| 5,667,347 A | * | 9/1997 | Matthews | 411/150 |
| 2010/0047033 A1 | * | 2/2010 | Baumgartner et al. | 411/84 |

* cited by examiner

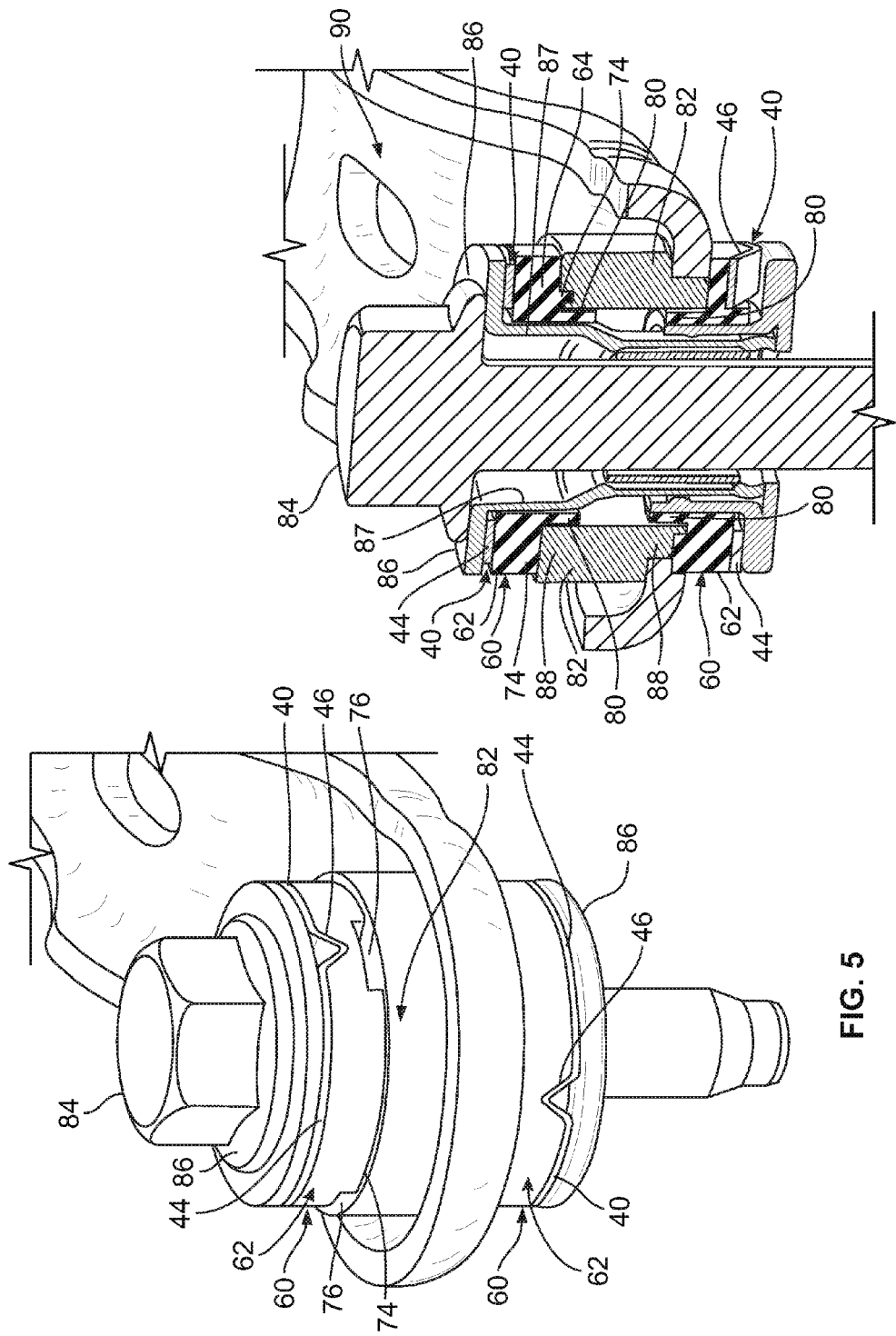

WASHER ASSEMBLY

RELATED APPLICATIONS

This application is a National Phase of International Application Number PCT/US2012/022374, filed Jan. 24, 2012 and claims benefits from U.S. Provisional Application No. 61/435,931, filed Jan. 25, 2011.

FIELD OF THE EMBODIMENTS

Embodiments of the present invention generally relate to a washer assembly, and, more particularly, to a washer assembly including a metal washer bonded to a rubber isolator.

BACKGROUND

FIG. 1 illustrates a sectional view of a known isolation assembly 10. The assembly 10 includes upper and lower bushings 12 and 14, respectively, and upper and lower rubber grommets 16 and 18, respectively. The bushings 12 and 14 and grommets 16 and 18 are separate and distinct from one another. That is, when the assembly 10 is not compressively secured between a fastener and a work-piece, the grommets 16 and 18 would simply detach from the bushings 12 and 14. Each bushing 12 and 14 includes a hollow cylindrical shaft 20 integrally formed with an outturned, planar collar 22 that is generally perpendicular to the shaft 20. Each grommet 16 and 18 includes a generally circular main body 24 defining a central opening. The main bodies 24 fit around the shafts 20.

As shown in FIG. 1, the isolation assembly 10 is used to isolate a fastener 26 and/or work-piece (not shown), such as a bolt, from a work-piece 28, such as a frame, panel, or the like. The work-piece 28 includes a through-hole 30 into which a shaft 32 of the fastener 26 passes. Additionally, the shafts 20 of the bushings 12 and 14 pass into the through-hole 30, as well as portions of the grommets 16 and 18. In this manner, the fastener 26 and the bushings 12 and 14 are isolated from the work-piece 28. Only the rubber grommets 16 and 18 contact the work-piece 28, thereby protecting the work-piece 28 form scratches, gouges, and the like.

The grommets 16 and 18 are compressively sandwiched between the collars 22 of the bushings 12 and 14 and the work-piece 28. As the rubber of the grommets 16 and 18 sets from standard loading, the amount of force exerted into the grommets 16 and 18 (that is, the "load") is directly affected. Over time, the force exerted into the grommets 16 and 18 may weaken the grommets 16 and 18. Moreover, the rubber within the grommets 16 and 18 may degrade and become weak.

A typical rubber grommet, such as the grommets 16 or 18, is compressed by the fastener head 34 in conjunction with the collar 22 of the bushing 12, for example. As the grommets 16 and 18 permanently set, the effective amount of compression experienced by the grommets 16 and 18 is reduced. Consequently, the grommets 16 and 18 provide less protecting and isolating load to the work-piece 28.

In general, an increase in load exerted into the work-piece 28 may result in substantial movement, such as shifting, of the work-piece 28 itself and/or the fastener 26. Consequently, the grommets 16 and 18 may permanently set in uneven positions, thereby further diminishing proper isolation. In general, over time, a rubber grommet 16 or 18 in compression will permanently set. Typically, permanent setting of the rubber results in a height change and diminishes load and isolation benefits.

During peak operating conditions, a force increase of 500-1000% may be exerted into the grommets 16 and 18. During this time, the grommets 16 and 18 typically allow too much movement for the system to continue to function properly.

SUMMARY OF THE EMBODIMENTS

Certain embodiments provide a washer assembly configured to isolate a work-piece from a fastener and/or another structure. The washer assembly includes a rubber isolator having at least one protuberance configured to directly contact a surface of the work-piece, and a metal strengthening member permanently secured to the rubber isolator. The protuberance(s) is configured to be compressed during a normal operating condition. The metal strengthening member is configured to be compressed during a peak operating condition in which greater force is exerted into the washer assembly than during the normal operating condition.

The rubber isolator may include a rubber isolator ring. The protuberance(s) may include at least one radial rib.

The metal strengthening member may include a metal washer. The metal washer may include regularly-spaced upsets. Each regularly-spaced upset may include plunging beams that connect at an apex. Optionally, the metal strengthening member may include a wave-shaped washer. Alternatively or additionally, the metal strengthening member may include a metal cup secured over the rubber isolator. The metal cup may include a planar rim integrally formed with a containing cuff.

The metal strengthening member may be permanently bonded to the rubber isolator. Further, the metal strengthening member may be embedded within the rubber isolator.

Certain embodiments provide a system including a work-piece having a through-hole, a fastener having a shaft integrally connected to a head, wherein the shaft passes through the through-hole, and a washer assembly configured to isolate the work-piece from the fastener and/or another structure such that the fastener does not directly contact the work-piece. The washer assembly includes a rubber isolator having at least one protuberance configured to directly contact a surface of the work-piece, and a metal strengthening member permanently secured to the rubber isolator. The protuberance(s) is configured to be compressed during a normal operating condition. The metal strengthening member is configured to be compressed during a peak operating condition in which greater force is exerted into the washer assembly than during the normal operating condition. The metal strengthening member does not directly contact the work-piece.

Certain embodiments provide a washer assembly configured to isolate a work-piece from a fastener and/or another structure, such as another work-piece. The washer assembly includes a rubber isolator ring having a plurality of regularly-spaced radial ribs configured to directly contact a surface of the work-piece, and a metal strengthening member embedded within the rubber isolator. The regularly-spaced radial ribs are configured to be compressed during a normal operating condition. The metal strengthening member is configured to be compressed during a peak operating condition in which greater force is exerted into the washer assembly than during the normal operating condition. The metal strengthening member maintains the shape of the rubber isolator.

BRIEF DESCRIPTION OF THE DRAWINGS

FIG. 5 illustrates an isometric view of washer assemblies isolating a work-piece from a fastener and another work-piece, according to an embodiment.

FIG. 6 illustrates an axial sectional view of washer assemblies isolating a work-piece from a fastener and another work-piece, according to an embodiment.

Figure 1:
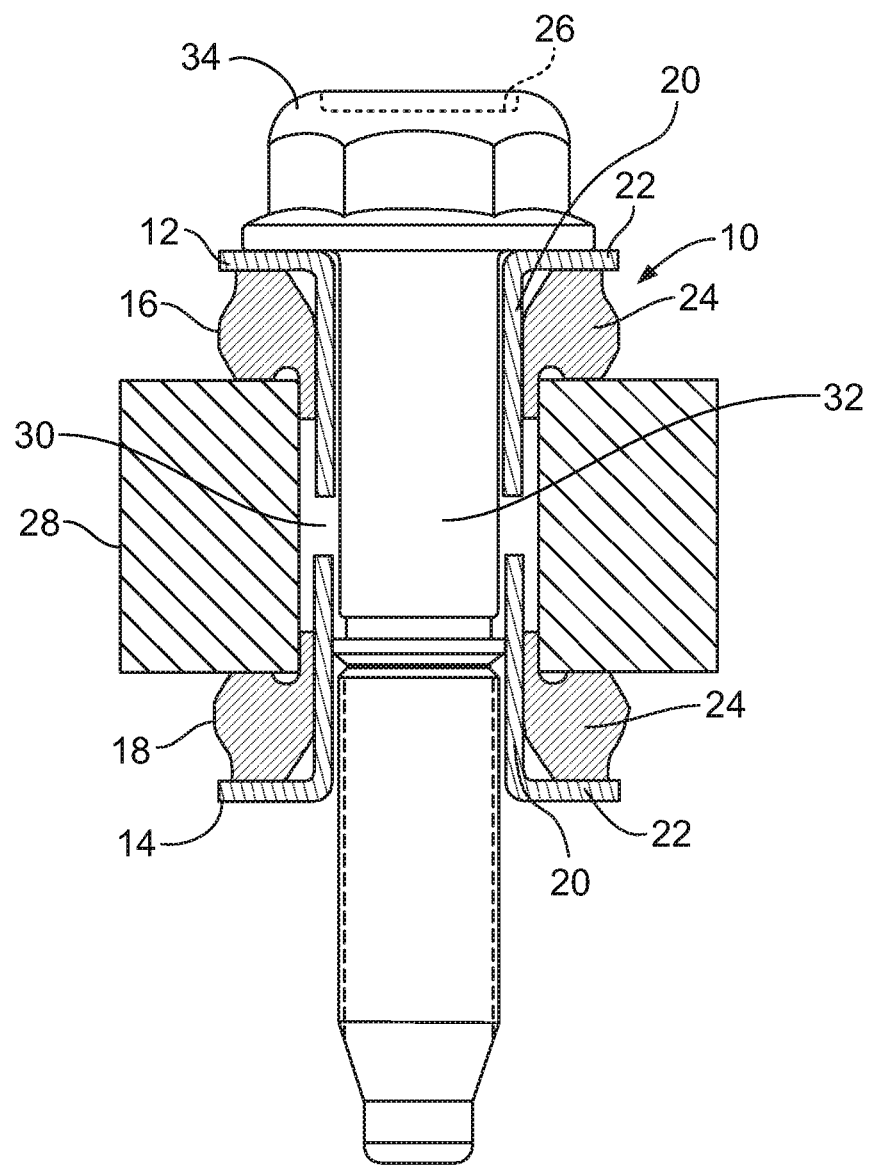
FIG. 1 illustrates a sectional view of a known isolation assembly.

Before the embodiments are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Figure 2:
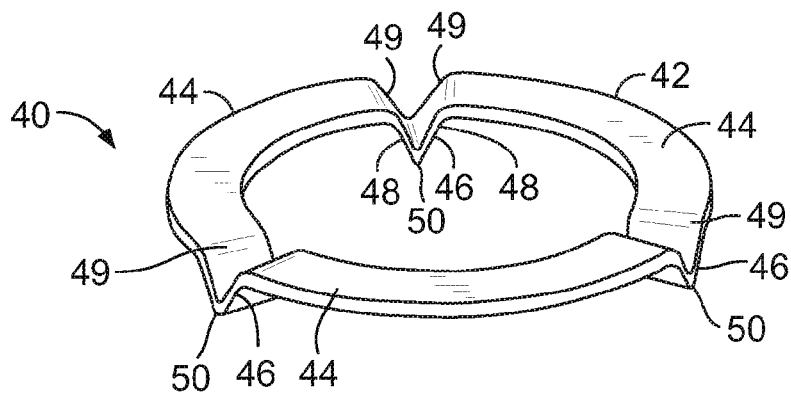
FIG. 2 illustrates an isometric top view of a metal washer, according to an embodiment.

FIG. 2 illustrates an isometric top view of a metal washer 40 or strengthening member, according to an embodiment. The washer 40 may be formed of various metals, such as aluminum, carbon steel, stainless steel, or the like. The washer 40 includes a generally circular main body 42 having flat planar surfaces 44 and regularly-spaced upsets 46. That is, the upsets 46 are spaced the same radial distance from one another. Each upset 46 is a portion of the main body 42 that is a crimped, dented, or otherwise formed portion of the main body 42 that is out of plane with the flat planar surfaces 44. The washer 40 may include more or less upsets 46 than those shown. Additionally, the upsets 46 may be spaced from one another in a non-regular pattern.

Each upset 46 includes opposing plunging beams 48 having proximal ends 49 that integrally connect to a planar surface 44, and distal ends that connect to one another at an apex 50. Thus, each upset 46 is formed as a V. However, the upsets 46 may be formed as various other shapes that are out of plane with the planar surfaces 44. For example, the upsets 46 may be waved portions.

Figure 3:
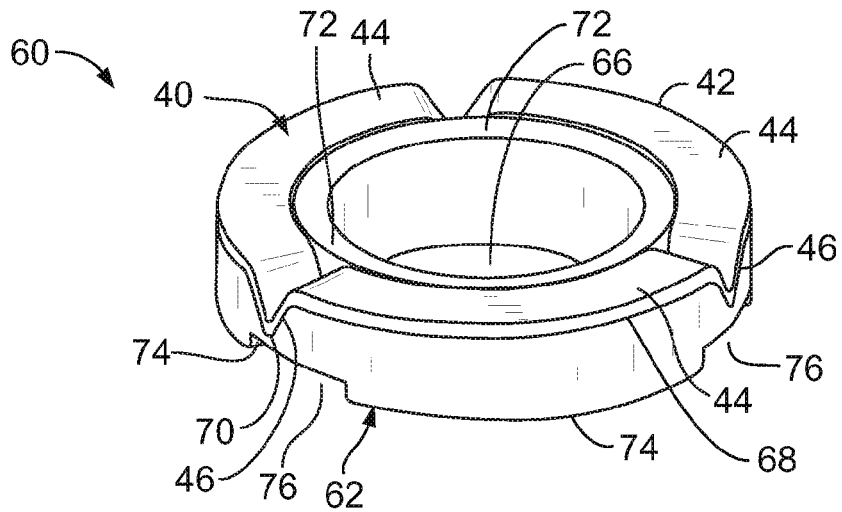
FIG. 3 illustrates an isometric top view of a washer assembly, according to an embodiment.

FIG. 3 illustrates an isometric top view of a washer assembly 60, according to an embodiment. The washer assembly 60 includes the washer 40 secured to a rubber isolator ring 62 or base. The washer 40 may be permanently secured to the rubber isolator ring 62, such as through bonding and curing. For example, the washer 40 may be secured to the rubber isolator ring 62 through an adhesive and then cured to form a rigid bond between the metal washer 40 and the rubber of the isolator ring 62. Further, the washer 40 may be completely embedded within the rubber isolator ring 62. For example, the washer 40 may be completely enveloped by the rubber isolator ring 62. In this embodiment, FIG. 3 shows the washer 40 simply for clarity, but it is to be understood that the washer 40 may be completely encased within the rubber isolator ring 62.

The isolator ring 62 includes a main annular body 64 having a central opening 66 formed therethrough. The main body 64 includes planar surfaces 68 that support the planar surfaces 44 of the main body 42 of the washer 40. Reciprocal divots 70 receive the upsets 46 of the washer 40. The divots 70 may or may not be formed through an entire width of the main annular body 64. As shown in FIG. 3, the divots 70 are not formed through an entire width of the main annular body 64. Instead, the divots 70 are formed through an outer portion that coincides with the width of the upsets 46. In this manner, the main annular body 64 provides a robust interior ring support 72 that provides increased strength and rigidity.

Radial ribs 74, tabs, ridges, protuberances, or the like extend from a lower portion of the annular body 64. The ribs 74 are separated by evenly spaced gaps 76

Figure 4:
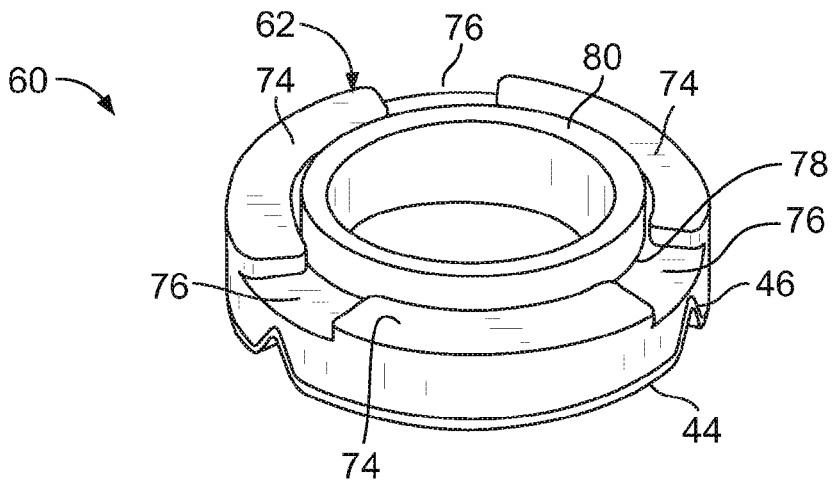
FIG. 4 illustrates an isometric bottom view of a washer assembly, according to an embodiment.

FIG. 4 illustrates an isometric bottom view of the washer assembly 60, according to an embodiment. As shown in FIG. 4, the radial ribs 74 surround an interior recessed rim 78 that surrounds a hollow tube 80 extending therefrom. The tube 80 is configured to extend into a through-hole of a work-piece, while the ribs 74 are configured to abut a planar surface of the work-piece, as shown in FIG. 6, in particular.

FIG. 5 illustrates an isometric view of washer assemblies 60 isolating a work-piece 82 from a fastener 84 and another work-piece, according to an embodiment. While two washer assemblies 60 are shown, more or less may be used. For example, only one washer assembly 60 may be used.

The fastener 84 includes securing flanges 86 or compression limiters that contact the planar surfaces 44 of the washers 40. However, neither the fastener 84, nor the metal washers 40, contacts the surface of the work-piece 82. Instead, the radial ribs 74 contact the work-piece 82. The radial ribs 74 contacting the work-piece 82 provide the first phase of load dampening in which the rubber of the isolating ring 62 dampens vibrations and isolates the work-piece 82 from the fastener 84 during normal operating conditions.

As shown, the washer 40 may be positioned within a half of the washer assembly 60 that is distally located from the work-piece 82. As such, the rubber of the isolator ring 62 is able to absorb the forces exerted into the work-piece 82 during normal operating conditions. However, increased force exerted into the washer assembly 60 is ultimately translated into the stiffened backbone defined by the washer 40. The stiffer and stronger washer 40 resists the force and provides strength to the isolator ring 62. The upsets 46 act to resiliently absorb the increased load and disperse the increased force away from the planar surfaces 44 of the washer 40. That is, the upsets 46 strengthen the washer 40 and decrease the likelihood of the washer 40 cracking or otherwise breaking (in contrast to a flat washer). Alternatively, the washer 40 may be positioned at various levels within the isolator ring 62.

FIG. 6 illustrates an axial sectional view of the washer assemblies 60 isolating the work-piece 82 from the fastener 84 and another work-piece, such as bracket 90, according to an embodiment. As noted above, the interior tube 80 of the isolator ring 62 is sandwiched between an interior diameter wall of the work-piece 82 and a bushing 87 around the fastener 84. Further, the radial ribs 74 contact planar surfaces 88 of the work-piece 82.

Under normal operating conditions (during a first phase of loading), the radial ribs 74 are compressed between the work-piece 82 and the annular body 64 of the isolator ring 62. During this normal loading phase, the metal upsets 46 (shown in FIGS. 2-6) of the washer 40 remain uncompressed. However, as a load is applied to a bracket 90 connected to the work-piece 82 during peak operating conditions (that is, when increased force is applied), the work-piece 82 will tend to compress either the top or bottom isolator rings 62 more. Because of the positioning of the metal upsets 46 in the isolator ring 46, however, the resistance to movement of the isolator ring 62 is drastically increased. Up until the point of increased peak loading, only the rubber ribs 74 are compressed. With increased loading, the entirety of the rubber isolator ring 62 is prevented from being compressed by the integral metal washer 40. As such, when compared with the standard rubber isolator (such as shown in FIG. 1), movement and permanent setting are minimized due to the stiffening support of the metal washer 40. Moreover, it has been found that the metal upsets 46 within the rubber isolator ring 62 substantially increase the resistance to movement and compression of the isolator ring 62.

Figure 7:
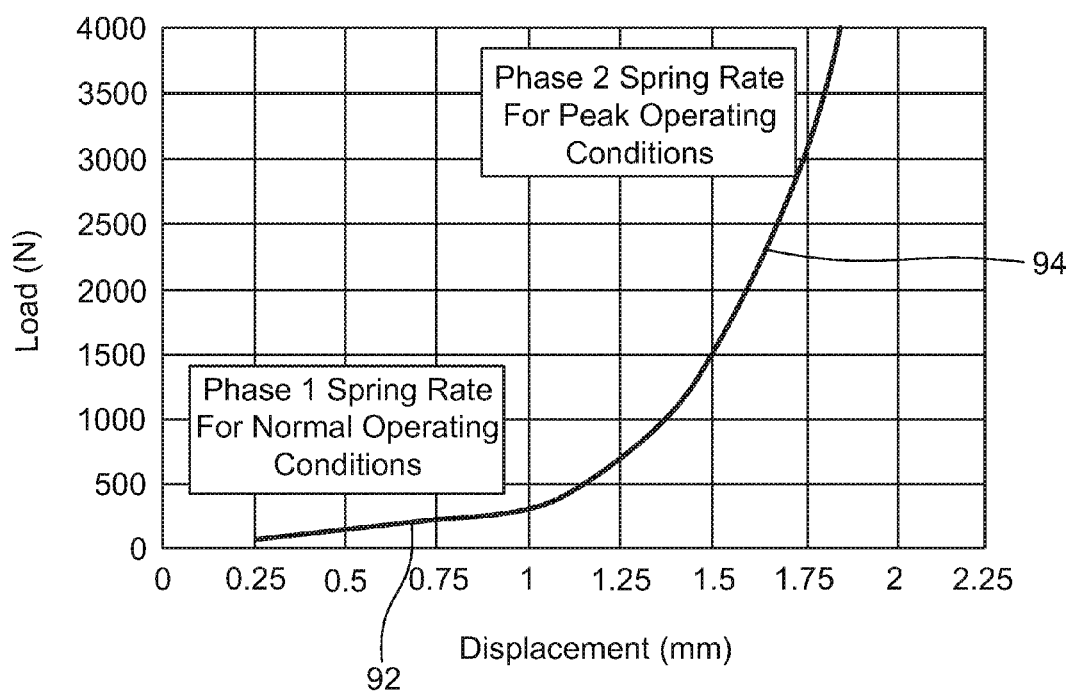
FIG. 7 illustrates a chart of spring rates of a washer assembly during normal and peak operating conditions, according to an embodiment.

FIG. 7 illustrates a chart of spring rates of the washer assembly 60 during normal and peak operating conditions, according to an embodiment. During normal operating conditions 92 (Phase 1), the radial ribs 74 of the isolator ring 62 are compressed. However, during peak operating conditions 94 (Phase 2), the metal washer 40 compresses, but provides substantial strength to the washer assembly 60 to allow it to operate under high load conditions, while at the same time, control displacement. As can be seen, with increased compression of the washer assembly 60, the spring rate increases dramatically.

Referring to FIGS. 2-7, each washer assembly 60 provides two distinct loading conditions. The first phase 92 is used for low load (normal) operating conditions. As the isolated work-piece 82 begins to apply more force to the isolator ring 62 in high load conditions (peak operation), the isolator ring 62 transitions to the second loading phase 94, which is drastically stiffer than the first phase and is used to control movement during such conditions.

The radial ribs 74 are used for pre-load and normal operating conditions. The washer 40 having the upsets 46 is activated during the peak loading conditions. That is, during normal operation, the rubber isolator ring 62 isolates the work-piece 82 from the fastener 84. However, with increased load, the metal washer 40 provides a stiffening support or backbone that strengthens the assembly 60 and prevents the rubber isolator ring 62 from permanently setting in an undesired position.

The washer assembly 60 provides damping and vibration isolation between the work-piece 82 and the fastener 84 and another work-piece, such as the bracket 90. The washer assembly 60 combines the stiff spring rate typically required to limit system movement during peak load conditions (through the metal washer 40), with the known and trusted isolation effects of the rubber isolator ring 62 at normal operating conditions.

As described above, the washer assembly 60 includes the formed metal washer 40 permanently bonded to or within the rubber isolator ring 62. The washer assembly 60 provides long-lasting rubber isolation. Because the rubber is bonded directly to the formed washer 40, the rubber of the isolator ring 62 is in a state of shear load, in contrast to compression load. Atomically, rubber has a much longer life when loaded in shear, and experiences minimal amounts of permanent set over time, in contrast to compression loading. With the addition of the metal washer 40 backbone, the assembly 60 experiences less permanent set over time, as compared to typical rubber isolators, such as shown in FIG. 1.

Further, because only the rubber isolator ring 62 comes in direct contact with the work-piece 82, the washer assembly 60 is able to isolate the metal or plastic of the work-piece 82 with little or no chance of corrosion. Any possible galvanic cell is eliminated because of the rubber-only contact. A galvanic cell occurs when different metals contact one another. One metal acts as an anode, while the other metal acts as a cathode. Electrons migrate from the anode to the cathode. For example, when carbon steel and stainless steel are in contact with moisture, the carbon steel acts as an anode, and slowly corrodes. However, the rubber contact of the washer assembly 60, which prevents metal contact with the work-piece 82, breaks any possible galvanic cell, thereby preventing corrosion.

Figure 8:
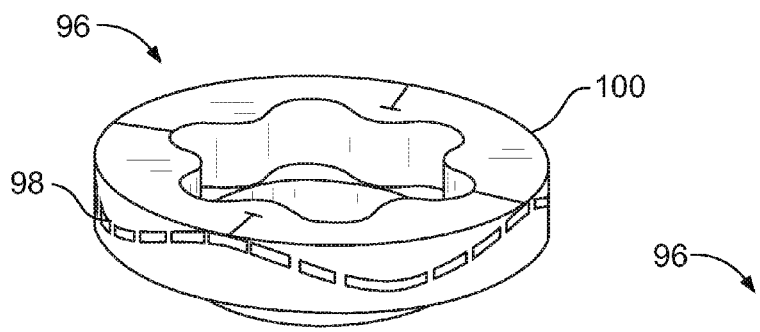
FIG. 8 illustrates an isometric top view of a washer assembly, according to an embodiment.
Figure 9:
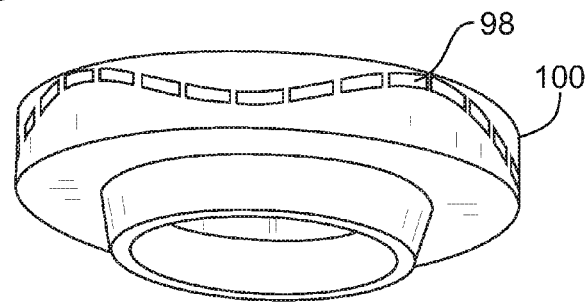
FIG. 9 illustrates an isometric bottom view of a washer assembly, according to an embodiment.
Figure 10:
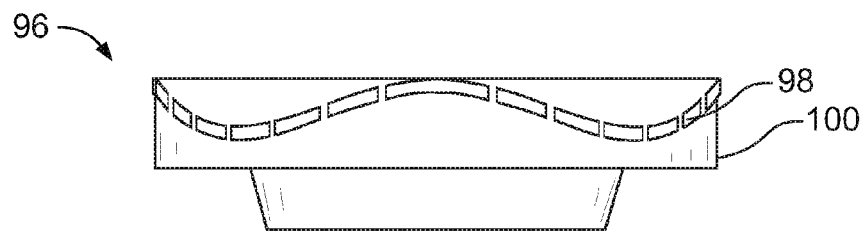
FIG. 10 illustrates a front view of a washer assembly, according to an embodiment.
Figure 11:
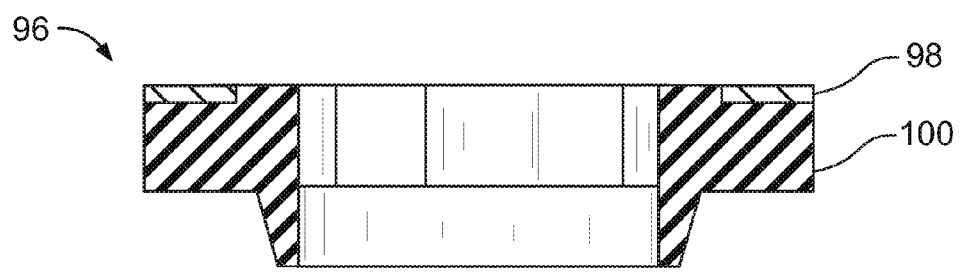
FIG. 11 illustrates an axial cross-sectional view of a washer assembly, according to an embodiment.

FIG. 8 illustrates an isometric top view of a washer assembly 96, according to an embodiment. FIG. 9 illustrates an isometric bottom view of the washer assembly 96. FIG. 10 illustrates a front view of the washer assembly 96. FIG. 11 illustrates an axial cross-sectional view of the washer assembly 96.

Referring to FIGS. 8-11, the washer assembly 96 is similar to the washer assembly 60 except that, instead of having a washer with V-shaped upsets, the washer assembly 96 includes a wave-shaped washer 98 within a rubber isolator ring 100. The wave-shaped washer 98 may be embedded within the washer assembly 60. The washer 98 is shown in dashed format to clarify its position within the washer assembly 60. However, the rubber isolator ring 100 may be formed such that a top surface is configured to receive and retain the wave-shaped washer 98. The wave-shaped washer 98 may be permanently bonded to the rubber isolator ring 100.

As shown, the wave-shaped washer 98 may be positioned proximate a top portion of the washer assembly 60. Similar to the washer assembly 60, the rubber at the bottom portion of the assembly 60 is first compressed during normal operating conditions. However, during peak operating conditions, as the wave-shaped washer is compressed, the spring rate of the assembly 96 increases dramatically. The wave shape of the washer 98 ensures that portions of the washer 98 are out of plane with one another.

Figure 12:
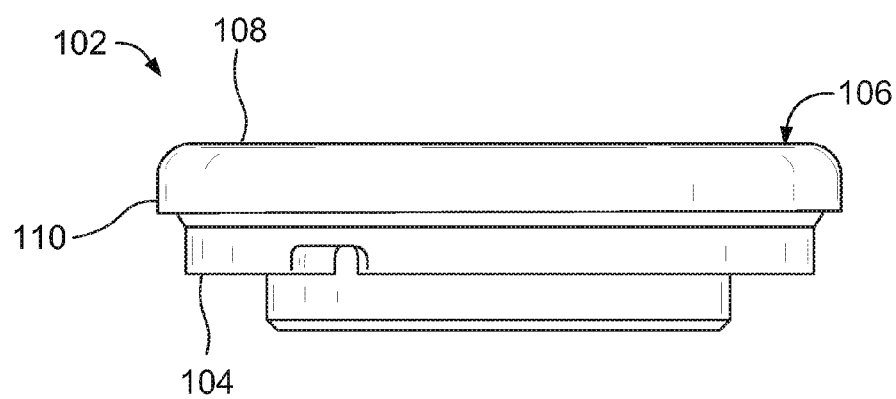
FIG. 12 illustrates a front view of a washer assembly, according to an embodiment.
Figure 13:
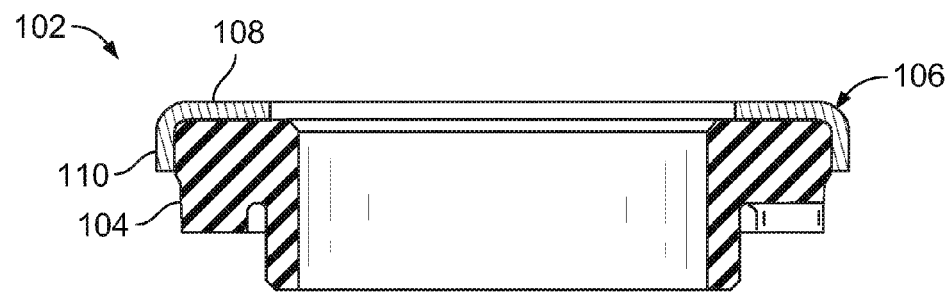
FIG. 13 illustrates an axial cross-sectional view of a washer assembly, according to an embodiment.
Figure 14:
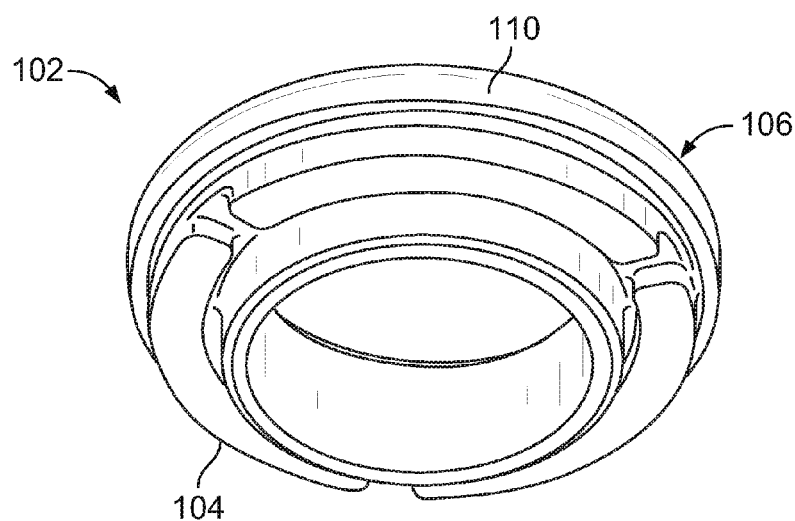
FIG. 14 illustrates an isometric bottom view of a washer assembly, according to an embodiment.

FIG. 12 illustrates a front view of a washer assembly 102, according to an embodiment. FIG. 13 illustrates an axial cross-sectional view of the washer assembly 102. FIG. 14 illustrates an isometric bottom view of the washer assembly 102.

Referring to FIGS. 12-14, the washer assembly 102 includes a rubber isolator ring 104 similar to those described above, and a metal cup 106 bonded over a top portion of the isolator ring 104. The metal cup 106 includes a top rim 108 overlaying a top surface of the isolator ring 104. The top rim 108 is integrally formed with a containing cuff 110 that is formed over an upper lateral portion of the isolator ring 104. The cup 106 may be permanently bonded over the isolator ring 104. Optionally, the cup 106 may be embedded within the isolator ring 104, such that a layer of rubber envelopes the cup 106.

The containment cuff 110 provides a barrier that contains the top portion of the rubber isolator ring 104. Additionally, it has been found that the cup 106 is able to contain and stabilize the rubber isolator ring 104 when larger force compressions are exerted into the washer assembly 102. Other than the overlaying metal cup 106, the washer assembly 102 may be configured the same as those described above. Additionally, an internal washer, such as the washer 40 or washer 98, may be embedded within the isolator ring 104 in order to provide increased strength and durability.

Thus, embodiments provide a washer assembly that controls movement and isolates a work-piece from a fastener and/or another work-piece over a wide range of force. Embodiments provide a rubber isolator ring secured to a metal washer that provides increased strength and limits undesired permanent setting. Embodiments provide a washer assembly that is configured to provide two-stage load-bearing isolation: a first stage in which a portion of the rubber isolator ring is compressed, and a second stage in which the metal washer compresses. Unlike previously-known rubber isolators, such as shown in FIG. 1, embodiments limit system movement during peak operating conditions.

While various spatial and directional terms, such as top, upper, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A washer assembly configured to isolate a work-piece from a fastener and/or another structure, the washer assembly comprising:
   a rubber isolator having an upper portion, a lower portion, a side portion extending therebetween and an axis extending therethrough, the rubber isolator further having at least one protuberance extending from the lower portion in a direction of the axis and being configured to directly contact a surface of the work-piece; and
   a metal strengthening member permanently secured to the rubber isolator so as to form a single, non-detachable unit, wherein the at least one protuberance is configured to be compressed during a normal operating condition, and wherein the metal strengthening member is configured to be compressed during a peak operating condition in which greater force is exerted into the washer assembly than during the normal operating condition, said metal strengthening member being configured to not contact the surface of the work-piece.

2. The washer assembly of claim 1, wherein the rubber isolator comprises a rubber isolator ring, and wherein at least one protuberance comprises at least one radial rib.

3. The washer assembly of claim 1, wherein the metal strengthening member comprises a metal washer.

4. The washer assembly of claim 3, wherein the metal washer comprises regularly-spaced upsets.

5. The washer assembly of claim 4, wherein each regularly-spaced upset comprises plunging beams that connect at an apex.

6. The washer assembly of claim 1, wherein the metal strengthening member comprises a wave-shaped washer.

7. The washer assembly of claim 1, wherein the metal strengthening member comprises a metal cup secured over the rubber isolator.

8. The washer assembly of claim 7, wherein the metal cup comprises a planar rim integrally formed with a containing cuff.

9. The washer assembly of claim 1, wherein the metal strengthening member is permanently bonded to the rubber isolator.

10. The washer assembly of claim 1, wherein the metal strengthening member is embedded within the rubber isolator.

11. A system comprising:
    a work-piece having a through-hole;
    a fastener having a shaft integrally connected to a head, wherein the shaft passes through the through-hole; and
    a washer assembly configured to isolate the work-piece from the fastener and/or another structure such that the fastener does not directly contact the work-piece, the washer assembly comprising:
    a rubber isolator having an upper portion, a lower portion, a side portion extending therebetween and an axis extending therethrough, the rubber isolator further having at least one protuberance extending from the lower portion in a direction of the axis and being configured to directly contact a surface of the work-piece; and
    a metal strengthening member permanently secured to the rubber isolator so as to form a single, non-detachable unit, wherein the at least one protuberance is configured to be compressed during a normal operating condition, wherein the metal strengthening member is configured to be compressed during a peak operating condition in which greater force is exerted into the washer assembly than during the normal operating condition, and wherein the metal strengthening member does not directly contact the work-piece.

12. The system of claim 11, wherein the rubber isolator comprises a rubber isolator ring, and wherein at least one protuberance comprises at least one radial rib.

13. The system of claim 11, wherein the metal strengthening member comprises a metal washer having upsets, wherein each upset comprises plunging beams that connect at an apex.

14. The system of claim 11, wherein the metal strengthening member comprises a wave-shaped washer.

15. The system of claim 11, wherein the metal strengthening member comprises a metal cup secured over the rubber isolator, wherein the metal cup comprises a planar rim integrally formed with a containing cuff.

16. The system of claim 11, wherein the metal strengthening member is permanently bonded to the rubber isolator.

17. The system of claim 11, wherein the metal strengthening member is embedded within the rubber isolator.

18. A washer assembly configured to isolate a work-piece from a fastener and/or another structure, the washer assembly comprising:
    a rubber isolator ring having a plurality of regularly-spaced radial ribs configured to directly contact a surface of the work-piece; and
    a metal strengthening member embedded within the rubber isolator, wherein the plurality of regularly-spaced radial ribs are configured to be compressed during a normal operating condition, wherein the metal strengthening member is configured to be compressed during a peak operating condition in which greater force is exerted into the washer assembly than during the normal operating condition, and wherein the metal strengthening member maintains the shape of the rubber isolator.

19. The washer assembly of claim 18, wherein the metal strengthening member comprises a metal washer having regularly-spaced upsets, and wherein each regularly-spaced upset comprises plunging beams that connect at an apex.

20. The washer assembly of claim 18, wherein the metal strengthening member comprises a metal cup secured over the rubber isolator, and wherein the metal cup comprises a planar rim integrally formed with a containing cuff.

* * * * *